United States Patent
Wang et al.

(10) Patent No.: US 12,010,556 B2
(45) Date of Patent: Jun. 11, 2024

(54) NETWORK DEVICE TRANSMISSION BANDWIDTH REDUCTION METHOD AND DEVICE

(71) Applicant: HUAWEI TECHNOLOGIES CO., LTD., Shenzhen (CN)

(72) Inventors: Ding Wang, Xi'an (CN); Liwei Cui, Xi'an (CN); Jian Wang, Beijing (CN); Haibo Xu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 323 days.

(21) Appl. No.: 17/439,100

(22) PCT Filed: Mar. 23, 2020

(86) PCT No.: PCT/CN2020/080726
§ 371 (c)(1),
(2) Date: Sep. 14, 2021

(87) PCT Pub. No.: WO2020/187331
PCT Pub. Date: Sep. 24, 2020

(65) Prior Publication Data
US 2022/0150762 A1    May 12, 2022

(30) Foreign Application Priority Data
Mar. 21, 2019   (CN) .......................... 201910217848.2

(51) Int. Cl.
*H04W 28/20*   (2009.01)
*H04W 72/20*   (2023.01)
(52) U.S. Cl.
CPC ........... *H04W 28/20* (2013.01); *H04W 72/20* (2023.01)

(58) Field of Classification Search
CPC ...... H04L 5/0035; H04L 5/001; H04L 5/0094; H04L 5/0098; H04B 7/024; H04B 7/022;
(Continued)

(56) References Cited

U.S. PATENT DOCUMENTS

2012/0275335 A1   11/2012   Huang
2013/0114576 A1*   5/2013   Kwon ................... H04W 28/18
                                                370/336
(Continued)

FOREIGN PATENT DOCUMENTS

CN    101778459 A    7/2010
CN    104038968 A    9/2014
(Continued)

OTHER PUBLICATIONS

R1-1902771, Apple Inc., UE Power Saving Techniques, 3GPP TSG-RAN WGI Meeting #96, Athens, Greece, Feb. 25-ist Mar. 2019, total 15 pages.
(Continued)

*Primary Examiner* — Ayaz R Sheikh
*Assistant Examiner* — Tarell A Hampton
(74) *Attorney, Agent, or Firm* — Rimon PC

(57) ABSTRACT

This application relates to a network device transmission bandwidth reduction method and related device for reducing a transmission bandwidth of a network device, thereby reducing power consumption and battery life of terminal devices. In one embodiment, a terminal receives transmission bandwidth reduction configuration information sent by a network device, where the transmission bandwidth reduction configuration information includes a set of transmission bandwidth reduction parameters supported by the network device. In response, the terminal sends a target transmission bandwidth reduction coefficient to the network device, where the target transmission bandwidth reduction coeffi- (Continued)

cient is a transmission bandwidth reduction coefficient of a serving cell expected by the terminal. A serving cell is one or more cells that currently provide services for the terminal. In this way, the network device reduces a transmission bandwidth of the serving cell based on the target transmission bandwidth reduction coefficient reported by the terminal.

12 Claims, 8 Drawing Sheets

(58) Field of Classification Search
CPC ......... H04W 28/0231; H04W 36/0069; H04W 72/20; H04W 72/0453
See application file for complete search history.

(56) References Cited

U.S. PATENT DOCUMENTS

| | | | | |
|---|---|---|---|---|
| 2013/0242818 | A1* | 9/2013 | Heo | H04L 1/1861 370/280 |
| 2014/0044029 | A1* | 2/2014 | Chou | H04W 52/0216 370/331 |
| 2015/0181461 | A1* | 6/2015 | Kim | H04W 28/0289 370/236 |
| 2015/0350972 | A1* | 12/2015 | Rao | H04W 76/18 455/441 |
| 2015/0351151 | A1* | 12/2015 | Huang | H04W 24/08 370/252 |
| 2019/0037425 | A1 | 1/2019 | Hong et al. | |
| 2019/0230536 | A1* | 7/2019 | Da Silva | H04L 1/0027 |

FOREIGN PATENT DOCUMENTS

| | | |
|---|---|---|
| CN | 105122717 A | 12/2015 |
| CN | 109104768 A | 12/2018 |

OTHER PUBLICATIONS

3GPP TR 38.840 V1.0.0 (Mar. 2019), 3rd Generation Partnership Project;Technical Specification Group Radio Access Network; NR; Study on UE Power Saving (Release 16), total 70 pages.
InterDigital, Impact of Bandwidth Part Activation/Deactivation on DRX, 3GPP TSG-RAN WG2 #99, R2-1708731, Berlin, Germany, Aug. 21-25, 2017, 2 pages.
3rd Generation Partnership Project; Technical Specification Group Radio Access Network;NR;Study on UE Power Saving(Release 16),3GPP TR 38.840 V1.0.0 (Mar. 2019),total:52pages.
Samsung et al., "RRM measurement to support bandwidth parts in NR",3GPP TSG-RAN WG2 NR #100 Meeting,Reno, USA, Nov. 27-Dec. 1, 2017, R2-1713869,total:5pages.

* cited by examiner

NETWORK DEVICE TRANSMISSION BANDWIDTH REDUCTION METHOD AND DEVICE

CROSS-REFERENCE TO RELATED APPLICATIONS

This application is a National Stage of International Application No. PCT/CN2020/080726, filed on Mar. 23, 2020, which claims priority to Chinese Patent Application No. 201910217848.2, filed on Mar. 21, 2019, both of which are hereby incorporated by reference in their entireties.

TECHNICAL FIELD

This application relates to the field of mobile network communications technologies, and in particular, to a network device transmission bandwidth reduction method, and a device.

BACKGROUND

For a mobile terminal device, a battery life is an important indicator. The mobile terminal device needs to support a necessary low-power solution. Currently, a low-power solution commonly used in 4G and 5G communications systems is a discontinuous reception (DRX) technical solution.

A DRX technology is a low-power technology used to reduce power consumption of a terminal. In a DRX mode, to implement continuous reception by the terminal, a fixed sleep cycle is preconfigured for the terminal. The DRX mode includes a wake up (wake up) mode and a sleep mode. If there is data transmission between a network side and the terminal, the terminal works in the wake up mode, and the terminal is in a power consumption mode; or if there is no data transmission between a network side and the terminal, the terminal works in the sleep mode, and the terminal is in a power saving mode.

As data scheduling is more frequent in the 5G communications system, frequent data transmission is performed between a network side and a terminal, and consequently the terminal always works in the wake up mode, and cannot work in the power saving mode. As a result, in the 5G communications system with frequent data scheduling, the existing DRX technology has a poor effect of reducing power consumption of the terminal, and consequently a battery life of the terminal is reduced.

SUMMARY

Embodiments of this application provide a network device transmission bandwidth reduction method, and a device, applicable to the field of mobile network communications technologies, to reduce a transmission bandwidth of a network device, thereby reducing power consumption of a terminal and improving a battery life of the terminal.

To achieve the foregoing technical objective, the embodiments of this application provide the following technical solutions:

According to a first aspect, an embodiment of this application provides a network device transmission bandwidth reduction method, including: a terminal receives transmission bandwidth reduction configuration information sent by a network device, where the transmission bandwidth reduction configuration information includes a set of transmission bandwidth reduction parameters supported by the network device, and the transmission bandwidth reduction configuration information also indicates that the network device supports transmission bandwidth reduction; and the terminal sends a target transmission bandwidth reduction coefficient to the network device, where the target transmission bandwidth reduction coefficient is a transmission bandwidth reduction coefficient that is of a serving cell and that is expected by the terminal, and the serving cell is all cells that currently provide services for the terminal, so that the network device reduces a transmission bandwidth of the serving cell based on the target transmission bandwidth reduction coefficient reported by the terminal.

It may be learned from the technical solution in the first aspect that, the network device sends the transmission bandwidth reduction configuration information to the terminal, and the terminal reports the target transmission bandwidth reduction coefficient that is of the serving cell and that is expected by the terminal to the network device, so that the network device can reduce, based on the target transmission bandwidth reduction coefficient reported by the terminal, the transmission bandwidth of the serving cell that provides a service for the terminal, to reduce a transmission bandwidth scheduled by the network device for the terminal, thereby reducing power consumption of the terminal and improving a battery life of the terminal.

With reference to the first aspect, in a first possible implementation of the first aspect in an embodiment of this application, that a terminal receives transmission bandwidth configuration information sent by a network device may include: the terminal receives the transmission bandwidth configuration information sent by the network device by using a radio resource control reconfiguration message; and in this case, the terminal may send the target transmission bandwidth reduction coefficient to the network device by using a terminal assistance information message, or the terminal may send the target transmission bandwidth reduction coefficient to the network device by using a media access control control element. In the first possible implementation of the first aspect, the transmission bandwidth configuration information is configured for the terminal by using the radio resource control reconfiguration message, and when transmission bandwidth configuration is performed by using the radio resource control reconfiguration message, the terminal reports the target transmission bandwidth reduction coefficient by using the terminal assistance information message or the media access control control element, so that the network device transmission bandwidth reduction method in this application can be implemented by appropriately extending the radio resource control reconfiguration message, the terminal assistance information message, and the media access control control element, and therefore is easier to implement.

With reference to the first aspect or the first possible implementation of the first aspect, in a second possible implementation of the first aspect in an embodiment of this application, the transmission bandwidth configuration information includes a minimum time interval for continuously sending the target transmission bandwidth reduction coefficient. It should be understood that, in this case, a transmission bandwidth reduction coefficient supported by the network device and the terminal may be preset. It may be learned from the second possible implementation of the first aspect that, the network device notifies the terminal of the minimum time interval for continuously sending the target transmission bandwidth reduction coefficient, so that the terminal reports the target transmission bandwidth reduction coefficient based on the minimum time interval. This can prevent the terminal from frequently reporting the transmission bandwidth reduction coefficient to cause an impact on the network device.

With reference to the second possible implementation of the first aspect, in a third possible implementation of the first aspect in an embodiment of this application, the transmission bandwidth configuration information further includes a set of transmission bandwidth reduction coefficients supported by the network device. That is, in this case, the transmission bandwidth configuration information includes not only the minimum time interval for continuously sending the target transmission bandwidth reduction coefficient but also a set of transmission bandwidth reduction coefficients supported by the network device. It should be understood that the network device may dynamically configure the transmission bandwidth reduction coefficient. It may be learned from the third possible implementation of the first aspect that, the network device may dynamically configure the transmission bandwidth reduction coefficient, to adapt to different network transmission bandwidth reduction scenarios, thereby effectively reducing energy consumption of the terminal.

With reference to the first aspect to the third possible implementation of the first aspect, in a fourth possible implementation of the first aspect in an embodiment of this application, the target transmission bandwidth reduction coefficient includes transmission bandwidth reduction coefficients respectively corresponding to all the serving cells that provide the services for the terminal. That is, the terminal reports the transmission bandwidth reduction coefficients respectively corresponding to all the serving cells. If there are N serving cells, the terminal reports N transmission bandwidth reduction coefficients. N is an integer greater than or equal to 1.

With reference to the first aspect to the third possible implementation of the first aspect, in a fifth possible implementation of the first aspect in an embodiment of this application, the target transmission bandwidth reduction coefficient includes a transmission bandwidth reduction coefficient jointly corresponding to all the serving cells that provide the services for the terminal.

With reference to the first aspect to the third possible implementation of the first aspect, in a sixth possible implementation of the first aspect in an embodiment of this application, the target transmission bandwidth reduction coefficient includes a transmission bandwidth reduction coefficient corresponding to a total bandwidth of all the serving cells that provide the services for the terminal.

According to a second aspect, an embodiment of this application provides a network device transmission bandwidth reduction method, including: a network device sends transmission bandwidth reduction configuration information to a terminal, where the transmission bandwidth reduction configuration information includes a set of transmission bandwidth reduction parameters supported by the network device, and the transmission bandwidth reduction configuration information also indicates that the network device supports transmission bandwidth reduction; the network device receives a target transmission bandwidth reduction coefficient sent by the terminal, where the target transmission bandwidth reduction coefficient is a transmission bandwidth reduction coefficient that is of a serving cell and that is expected by the terminal, and the serving cell is all cells that currently provide services for the terminal; and the network device reduces a transmission bandwidth of the serving cell based on the target transmission bandwidth reduction coefficient reported by the terminal.

It may be learned from the technical solution in the second aspect that, the network device sends the transmission bandwidth reduction configuration information to the terminal, and the terminal reports the target transmission bandwidth reduction coefficient that is of the serving cell and that is expected by the terminal to the network device, so that the network device can reduce, based on the target transmission bandwidth reduction coefficient reported by the terminal, the transmission bandwidth of the serving cell that provides a service for the terminal, to reduce a transmission bandwidth scheduled by the network device for the terminal, thereby reducing power consumption of the terminal and improving a battery life of the terminal.

With reference to the second aspect, in a first possible implementation of the second aspect in an embodiment of this application, that a network device sends transmission bandwidth configuration information to a terminal may include: the network device sends the transmission bandwidth configuration information to the terminal by using a radio resource control reconfiguration message; and in this case, the network device receives the target transmission bandwidth reduction coefficient sent by the terminal by using a terminal assistance information message, or the network device receives the target transmission bandwidth reduction coefficient sent by the terminal by using a media access control (MAC) control element. In the first possible implementation of the second aspect, the transmission bandwidth configuration information is configured for the terminal by using the radio resource control reconfiguration message, and when transmission bandwidth configuration is performed by using the radio resource control reconfiguration message, the terminal reports the target transmission bandwidth reduction coefficient by using the terminal assistance information message or the MAC control element, so that the network device transmission bandwidth reduction method in this application can be implemented by appropriately extending the radio resource control reconfiguration message, the terminal assistance information message, and the MAC control element, and therefore is easier to implement.

With reference to the second aspect or the first possible implementation of the second aspect, in a second possible implementation of the second aspect in an embodiment of this application, the transmission bandwidth configuration information includes a minimum time interval for continuously sending the target transmission bandwidth reduction coefficient. It should be understood that, in this case, a transmission bandwidth reduction coefficient supported by the network device and the terminal may be preset. It may be learned from the first possible implementation of the second aspect that, the network device notifies the terminal of the minimum time interval for continuously sending the target transmission bandwidth reduction coefficient, so that the terminal reports the target transmission bandwidth reduction coefficient based on the minimum time interval. This can prevent the terminal from frequently reporting the transmission bandwidth reduction coefficient to cause an impact on the network device.

With reference to the second possible implementation of the second aspect, in a third possible implementation of the second aspect in an embodiment of this application, the transmission bandwidth configuration information further includes a set of transmission bandwidth reduction coefficients supported by the network device. That is, in this case, the transmission bandwidth configuration information includes not only the minimum time interval for continuously sending the target transmission bandwidth reduction coefficient but also a set of transmission bandwidth reduction coefficients supported by the network device. It should be understood that the network device may dynamically configure the transmission bandwidth reduction coefficient. It may be learned from the third possible implementation of the second aspect that, the network device may dynamically configure the transmission bandwidth reduction coefficient, to adapt to different network transmission bandwidth reduction scenarios, thereby effectively reducing energy consumption of the terminal.

With reference to the second aspect to the third possible implementation of the second aspect, in a fourth possible implementation of the second aspect in an embodiment of this application, the target transmission bandwidth reduction coefficient includes transmission bandwidth reduction coefficients respectively corresponding to all the serving cells that provide the services for the terminal. That is, the terminal reports the transmission bandwidth reduction coefficients respectively corresponding to all the serving cells. If there are N serving cells, the terminal reports N transmission bandwidth reduction coefficients. N is an integer greater than or equal to 1.

With reference to the second aspect to the third possible implementation of the second aspect, in a fifth possible implementation of the second aspect in an embodiment of this application, the target transmission bandwidth reduction coefficient includes a transmission bandwidth reduction coefficient jointly corresponding to all the serving cells that provide the services for the terminal.

With reference to the second aspect to the third possible implementation of the second aspect, in a sixth possible implementation of the second aspect in an embodiment of this application, the target transmission bandwidth reduction coefficient includes a transmission bandwidth reduction coefficient corresponding to a total bandwidth of all the serving cells that provide the services for the terminal.

According to a third aspect, an embodiment of this application provides a terminal, including a receiving module and a sending module. The receiving module is configured to receive transmission bandwidth reduction configuration information sent by a network device, where the transmission bandwidth reduction configuration information includes a set of transmission bandwidth reduction parameters supported by the network device; and the sending module is configured to send a target transmission bandwidth reduction coefficient to the network device, where the target transmission bandwidth reduction coefficient is a transmission bandwidth reduction coefficient that is of a serving cell and that is expected by the terminal, and the serving cell includes all cells that currently provide services for the terminal.

In an implementation, the receiving module is configured to receive the transmission bandwidth reduction configuration information sent by the network device by using a radio resource control reconfiguration message; and the sending module is configured to send the target transmission bandwidth reduction coefficient to the network device by using a terminal assistance information message; or send the target transmission bandwidth reduction coefficient to the network device by using an MAC control element.

In an implementation, the transmission bandwidth reduction configuration information includes a minimum time interval for continuously sending the target transmission bandwidth reduction coefficient.

In an implementation, the transmission bandwidth reduction configuration information further includes a set of transmission bandwidth reduction coefficients supported by the network device.

In an implementation, the target transmission bandwidth reduction coefficient includes transmission bandwidth reduction coefficients respectively corresponding to all the serving cells that provide the services for the terminal.

In an implementation, the target transmission bandwidth reduction coefficient includes a transmission bandwidth reduction coefficient jointly corresponding to all the serving cells that provide the services for the terminal.

In an implementation, the target transmission bandwidth reduction coefficient includes a transmission bandwidth reduction coefficient corresponding to a total bandwidth of all the serving cells that provide the services for the terminal.

According to a fourth aspect, an embodiment of this application provides a network device, including a sending module, a receiving module, and a processing module. The sending module is configured to send transmission bandwidth reduction configuration information to a terminal, where the transmission bandwidth reduction configuration information includes a set of transmission bandwidth reduction parameters supported by the network device; the receiving module is configured to receive a target transmission bandwidth reduction coefficient sent by the terminal, where the target transmission bandwidth reduction coefficient is a transmission bandwidth reduction coefficient that is of a serving cell and that is expected by the terminal, and the serving cell includes all cells that currently provide services for and to the terminal; and the processing module is configured to reduce a transmission bandwidth of the serving cell based on the target transmission bandwidth reduction coefficient.

In an implementation, the sending module is configured to send the transmission bandwidth reduction configuration information to the terminal by using a radio resource control reconfiguration message; and the receiving module is configured to receive the target transmission bandwidth reduction coefficient sent by the terminal by using a terminal assistance information message; or receive the target transmission bandwidth reduction coefficient sent by the terminal by using a media access control (MAC) control element.

In an implementation, the transmission bandwidth reduction configuration information includes a minimum time interval for continuously sending the target transmission bandwidth reduction coefficient.

In an implementation, the transmission bandwidth reduction configuration information further includes a set of transmission bandwidth reduction coefficients supported by the network device.

In an implementation, the target transmission bandwidth reduction coefficient includes transmission bandwidth reduction coefficients respectively corresponding to all the serving cells that provide the services for the terminal.

In an implementation, the target transmission bandwidth reduction coefficient includes a transmission bandwidth reduction coefficient jointly corresponding to all the serving cells that provide the services for the terminal.

In an implementation, the target transmission bandwidth reduction coefficient includes a transmission bandwidth reduction coefficient corresponding to a total bandwidth of all the serving cells that provide the services for the terminal.

According to a fifth aspect, an embodiment of this application provides a terminal. The terminal includes a transceiver and a processor. The processor controls the transceiver to receive transmission bandwidth reduction configuration information sent by a network device, where the transmission bandwidth reduction configuration message carries a set of transmission bandwidth reduction parameters supported by the network device; and the processor further controls the transceiver to send a target transmission bandwidth reduction coefficient to the network device, where the target transmission bandwidth reduction coefficient is a transmission bandwidth reduction coefficient that is of a serving cell and that is expected by the terminal, and the serving cell can include all cells that currently provide services for the terminal.

In an implementation, the processor is configured to control the transceiver to receive the transmission bandwidth reduction configuration information sent by the network device by using a radio resource control reconfiguration message. That is, the processor controls the transceiver to receive the radio resource control reconfiguration message sent by the network device, and the processor parses the radio resource control reconfiguration message received by the transceiver, to obtain the transmission bandwidth reduction configuration information. Correspondingly, the processor is configured to control the transceiver to send the target transmission bandwidth reduction coefficient to the network device by using a terminal assistance information message. It should be understood that the terminal assistance information message carries the target transmission bandwidth reduction coefficient, to implement transmission of the target transmission bandwidth reduction coefficient between the terminal and the network device. Alternatively, the processor is configured to control the transceiver to send the target transmission bandwidth reduction coefficient to the network device by using a media access control (MAC) control element. It should be understood that the MAC control element carries the target transmission bandwidth reduction coefficient, to implement transmission of the target transmission bandwidth reduction coefficient between the terminal and the network device.

In an implementation, the transmission bandwidth reduction configuration information may include a minimum time interval for continuously sending the target transmission bandwidth reduction coefficient. It should be understood that, in this case, a transmission bandwidth reduction coefficient supported by the network device may be pre-negotiated by the network device and the terminal.

In an implementation, the transmission bandwidth reduction configuration information may include a minimum time interval for continuously sending the target transmission bandwidth reduction coefficient, and a set of transmission bandwidth reduction coefficients supported by the network device.

In an implementation, the target transmission bandwidth reduction coefficient may include at least one of the following: transmission bandwidth reduction coefficients respectively corresponding to all the serving cells that provide the services for the terminal; or a transmission bandwidth reduction coefficient jointly corresponding to all the serving cells that provide the services for the terminal; or a transmission bandwidth reduction coefficient corresponding to a total bandwidth of all the serving cells that provide the services for the terminal.

According to a sixth aspect, an embodiment of this application provides a network device, including a transceiver and a processor. The processor is configured to control the transceiver to send transmission bandwidth reduction configuration information to a terminal, where the transmission bandwidth reduction configuration message includes a set of transmission bandwidth reduction parameters supported by the network device; and the processor is further configured to control the transceiver to receive a target transmission bandwidth reduction coefficient sent by the terminal, where the target transmission bandwidth reduction coefficient includes a set of transmission bandwidth reduction parameters supported by the network device, and the serving cell is all cells that currently provide services for the terminal; and the processor is further configured to reduce a transmission bandwidth of the serving cell based on the target transmission bandwidth reduction coefficient.

In an implementation, the processor is configured to control the transceiver to send the transmission bandwidth reduction configuration information to the terminal by using a radio resource control reconfiguration message. Correspondingly, the processor is configured to control the transceiver to receive the target transmission bandwidth reduction coefficient sent by the terminal by using a terminal assistance information message. It should be understood that the terminal assistance information message carries the target transmission bandwidth reduction coefficient, to implement transmission of the target transmission bandwidth reduction coefficient between the terminal and the network device. Alternatively, the processor is configured to control the transceiver to receive the target transmission bandwidth reduction coefficient sent by the terminal by using a media access control element. It should be understood that the terminal assistance information message carries the target transmission bandwidth reduction coefficient, to implement transmission of the target transmission bandwidth reduction coefficient between the terminal and the network device.

In an implementation, the transmission bandwidth reduction configuration information may include a minimum time interval for continuously sending the target transmission bandwidth reduction coefficient. It should be understood that, in this case, a transmission bandwidth reduction coefficient supported by the network device may be pre-negotiated by the network device and the terminal.

In an implementation, the transmission bandwidth reduction configuration information may include a minimum time interval for continuously sending the target transmission bandwidth reduction coefficient, and a set of transmission bandwidth reduction coefficients supported by the network device.

In an implementation, the target transmission bandwidth reduction coefficient may include at least one of the following: transmission bandwidth reduction coefficients respectively corresponding to all the serving cells that provide the services for the terminal; or a transmission bandwidth reduction coefficient jointly corresponding to all the serving cells that provide the services for the terminal; or a transmission bandwidth reduction coefficient corresponding to a total bandwidth of all the serving cells that provide the services for the terminal.

According to a seventh aspect, an embodiment of this application provides a communications apparatus. The communications apparatus may be the terminal in the foregoing embodiment, or may be a part of the terminal or disposed in the terminal. The communications apparatus includes corresponding components (means) configured to execute the steps or functions described in the implementations in the first aspect and the results, for example, units, modules, and apparatuses. The steps or the functions may be implemented by using software, hardware (for example, circuits), or a combination of software and hardware.

According to an eighth aspect, an embodiment of this application provides another communications apparatus.

The communications apparatus may be the network device in the foregoing embodiment, or may be a part of the network device or disposed in the network device. The communications apparatus includes corresponding components (means) configured to execute the steps or functions described in the implementations in the second aspect and the results, for example, units, modules, and apparatuses. The steps or the functions may be implemented by using software, hardware (for example, circuits), or a combination of software and hardware.

According to a ninth aspect, an embodiment of this application provides a computer-readable storage medium. The computer-readable storage medium stores instructions. When the instructions are run on a computer, the computer is enabled to perform the network device transmission bandwidth reduction method in any one of the first aspect or the possible implementations of the first aspect.

According to a tenth aspect, an embodiment of this application provides a computer-readable storage medium. The computer-readable storage medium stores instructions. When the instructions are run on a computer, the computer is enabled to perform the network device transmission bandwidth reduction method in any one of the second aspect or the possible implementations of the second aspect.

According to an eleventh aspect, an embodiment of this application provides a computer program product. When the computer program product is run on a computer, the computer is enabled to perform the network device transmission bandwidth reduction method in any one of the first aspect or the possible implementations of the first aspect.

According to a twelfth aspect, an embodiment of this application provides a computer program product. When the computer program product is run on a computer, the computer is enabled to perform the network device transmission bandwidth reduction method in any one of the second aspect or the possible implementations of the second aspect.

According to a thirteenth aspect, an embodiment of this application provides a network transmission bandwidth reduction system. The system includes a terminal and a network device. The network device sends transmission bandwidth reduction configuration information to the terminal, where the transmission bandwidth reduction configuration information includes a set of transmission bandwidth reduction parameters supported by the network device; the terminal sends a target transmission bandwidth reduction coefficient to the network device, where the target transmission bandwidth reduction coefficient is a transmission bandwidth reduction coefficient that is of a serving cell and that is expected by the terminal, and the serving cell is all cells that currently provide services for the terminal; the network device receives the target transmission bandwidth reduction coefficient sent by the terminal; and the network device reduces a transmission bandwidth of the serving cell based on the target transmission bandwidth reduction coefficient.

In the system in the thirteenth aspect, the terminal may execute any implementation of the first aspect. Likewise, the network device may execute any implementation of the second aspect.

DESCRIPTION OF EMBODIMENTS

The following describes embodiments of this application with reference to the accompanying drawings. Clearly, the described embodiments are merely some rather than all of the embodiments of this application. It may be learned by a person of ordinary skill in the art that, with development of a technology and emergence of a new scenario, technical solutions provided in the embodiments of this application are also applicable to a similar technical problem.

The embodiments of this application provide a network transmission bandwidth reduction method, and a device, applicable to the field of mobile network communications technologies, to reduce a transmission bandwidth of a network device, thereby reducing power consumption of a terminal and improving a battery life of the terminal.

The terminal in the embodiments of this application may include various handheld devices, vehicle-mounted devices, wearable devices, or computing devices that have a wireless communication function, or other processing devices connected to a wireless modem. The terminal may be a mobile station (MS), a subscriber unit, a cellular phone, a smartphone, a wireless data card, a personal digital assistant (PDA for short) computer, a tablet computer, a wireless modem (modem), a handheld device, a laptop computer, a machine type communication (MTC) terminal, or the like.

An access network device may be an evolved NodeB (eNB or e-NodeB for short), a macro base station, a micro base station (also referred to as a "small cell"), a pico base station, an access point (AP), a transmission point (TP), a gNodeB (new generation Node B, new generation NodeB), or the like in an LTE system, an NR system, or a licensed-assisted access using LTE (authorized auxiliary access long-term evolution, LAA-LTE) system.

As described above, a DRX technology is a low-power technology used to reduce power consumption of a terminal.

Figure 1A:
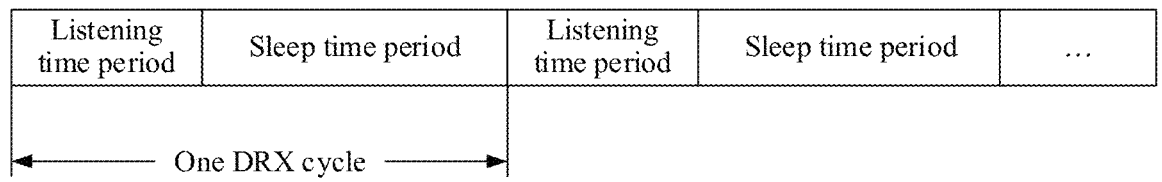
FIG. 1a is a schematic structural diagram of a DRX cycle.

FIG. 1a is a schematic structural diagram of a DRX cycle. As shown in FIG. 1a, one DRX cycle includes a listening time period and a sleep time period. In the listening time period of the DRX cycle, a terminal works in a wake up mode to listen to network scheduling, and in the sleep time period of the DRX cycle, the terminal works in a sleep mode to skip listening to network scheduling, to reduce power consumption. A media access control control element (MAC CE) is configured to transmit a control message of a MAC layer. In the MAC layer, in addition to transmitting upper-layer data from the MAC layer, a MAC CE is further transmitted in a MAC packet to implement a transmission control function.

In network networking, regardless of a networking manner, a dual connectivity (dual connectivity, DC) technology may be used to improve radio resource utilization and a network transmission rate. With continuous improvement of a network transmission rate, an existing low-power technology for reducing power consumption of a terminal has a poor effect of reducing the power consumption of the terminal. For example, when the terminal is in a dual connectivity state, frequent data scheduling is performed between a network side and the terminal, and the DRX technology cannot achieve an expected power consumption reduction effect. As a result, a battery life of the terminal is reduced, and a battery life requirement for the terminal, especially a mobile terminal device, cannot be met.

Figure 1B:
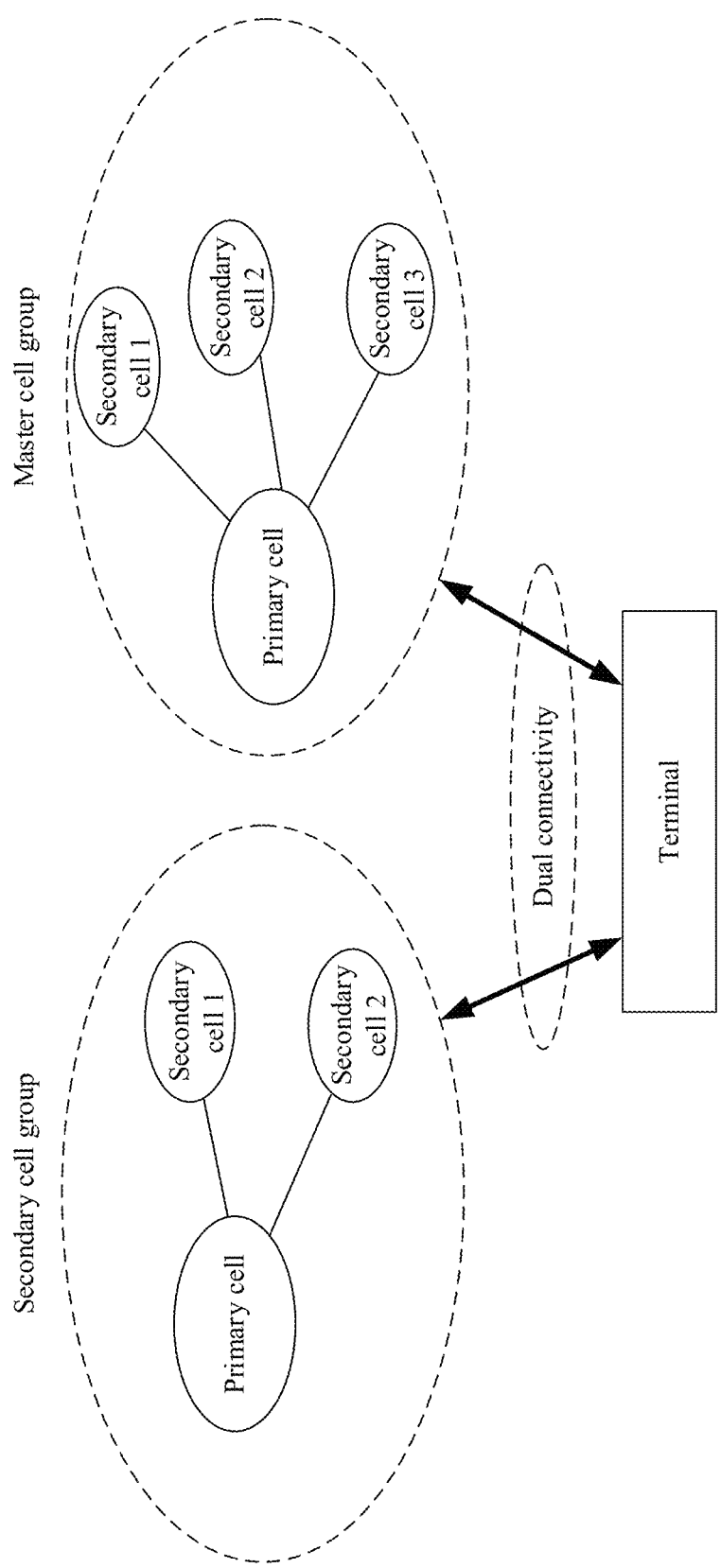
FIG. 1b is a schematic diagram of dual connectivity according to an embodiment of this application.

In the dual connectivity state, a concept of cell group is introduced. Specifically, FIG. 1b is a schematic diagram of dual connectivity according to an embodiment of this application. As shown in FIG. 1b, in the dual connectivity state, a terminal accesses both two independently configured cell groups. One of the two cell groups is referred to as a master cell group (MCG), and the other is referred to as a secondary cell group (SCG). The master cell group and the secondary cell group each include one primary cell and a plurality of secondary cells. A primary cell in the master cell group is referred to as a primary call (PCell), and a primary cell in the secondary cell group is referred to as a primary secondary cell (PSCell). Secondary cells in the master cell group and the secondary cell group are both referred to as secondary cells (SCell). The master cell group shown in FIG. 1b includes one primary cell and three secondary cells, and the secondary cell group includes one primary cell and two secondary cells.

Figure 2:
FIG. 2 is a schematic diagram of a wireless communications system according to an embodiment of this application.

FIG. 2 shows a wireless communications system according to an embodiment of this application.

As shown in FIG. 1b, the wireless communications system includes a terminal 201 and a network device 202.

The network device 202 sends transmission bandwidth reduction configuration information to the terminal 201, where the transmission bandwidth reduction configuration information includes a set of transmission bandwidth reduction parameters supported by the network device. After the terminal 201 receives the transmission bandwidth reduction configuration information, the terminal 201 sends a target transmission bandwidth reduction coefficient to the network device 202, where the target transmission bandwidth reduction coefficient is a transmission bandwidth reduction coefficient that is of a serving cell and that is expected by the terminal, and the serving cell includes all cells that currently provide services to the terminal. After the network device 202 receives the target transmission bandwidth reduction coefficient, the network device 202 reduces a transmission bandwidth of the serving cell based on the target transmission bandwidth reduction coefficient.

In an implementation, a configuration manner in which the network device 202 performs transmission bandwidth reduction configuration for the terminal 201 may be as follows: The network device 202 adds the transmission bandwidth reduction configuration information to a radio resource control (RRC) reconfiguration message, and sends the radio resource control reconfiguration message to the terminal 201.

When the terminal 201 receives, by using the radio resource control reconfiguration message, the transmission bandwidth reduction configuration information sent by the network device 202, the terminal 201 needs to return the target bandwidth reduction coefficient to the network device 202. A specific information carrying manner may include the following two manners. It should be noted that the network device 202 may alternatively perform transmission bandwidth reduction configuration for the terminal by using a message other than the radio resource control reconfiguration message. This is not specifically limited in this application.

In a first information carrying manner, the network device 202 performs transmission bandwidth reduction configuration for the terminal 201 by using other configuration (OtherConfig) information in the radio resource control reconfiguration message, and the terminal 201 adds the target transmission bandwidth reduction coefficient to a terminal assistance information message and sends the terminal assistance information message to the network device 202.

In a second information carrying manner, the network device 202 performs transmission bandwidth reduction configuration for the terminal 201 by using primary cell configuration (SpCellConfig) information in the radio resource control reconfiguration message, and the terminal 201 adds the target transmission bandwidth reduction coefficient to a media access control control element (MAC CE) and sends the MAC CE to the network device 202.

In the transmission bandwidth reduction configuration information configured by the network device 202 for the terminal 201, in a first configuration manner, the network device 202 configures, for the terminal 201, a minimum transmission time interval for continuously sending the target transmission bandwidth reduction coefficient. Specifically, the minimum transmission time interval for continuously sending the target transmission bandwidth reduction coefficient is carried in the transmission bandwidth reduction configuration message. In a second configuration manner, the network device 202 configures, for the terminal 201, a minimum transmission time interval for continuously sending the target transmission bandwidth reduction coefficient and the set of the transmission bandwidth reduction parameters supported by the network device 202.

The target transmission bandwidth reduction coefficient in the foregoing implementation may include but is not limited to the following three manners:

In a first transmission bandwidth reduction manner, the target transmission bandwidth reduction coefficient includes a plurality of transmission bandwidth reduction coefficients, each transmission bandwidth reduction coefficient corresponds to one serving cell that provides a service for the terminal 201, and a quantity of transmission bandwidth reduction coefficients is equal to a quantity of serving cells that provide services for the terminal 201. For example, if five serving cells provide services for the terminal 201, the target bandwidth reduction coefficient includes five bandwidth reduction coefficients, and the five serving cells each correspond to one of the five bandwidth reduction coefficients.

In a second transmission bandwidth reduction manner, the target transmission bandwidth reduction coefficient includes one transmission bandwidth reduction coefficient, and the transmission bandwidth reduction coefficient corresponds to all the serving cells that provide the services for the terminal 201.

In a third transmission bandwidth reduction manner, the target transmission bandwidth reduction coefficient includes one transmission bandwidth reduction coefficient, and the transmission bandwidth reduction coefficient corresponds to a bandwidth sum of all the serving cells that provide the services for the terminal 201.

To facilitate understanding of the network device transmission bandwidth reduction method in the embodiments of this application, the following separately describes the method in detail with reference to the foregoing first response manner and the foregoing second response manner.

In the first information carrying manner, the transmission bandwidth reduction configuration information is carried in the other configuration (OtherConfig) information in the radio resource control reconfiguration message, and the target transmission bandwidth reduction coefficient is carried in the terminal assistance information message.

Figure 3:
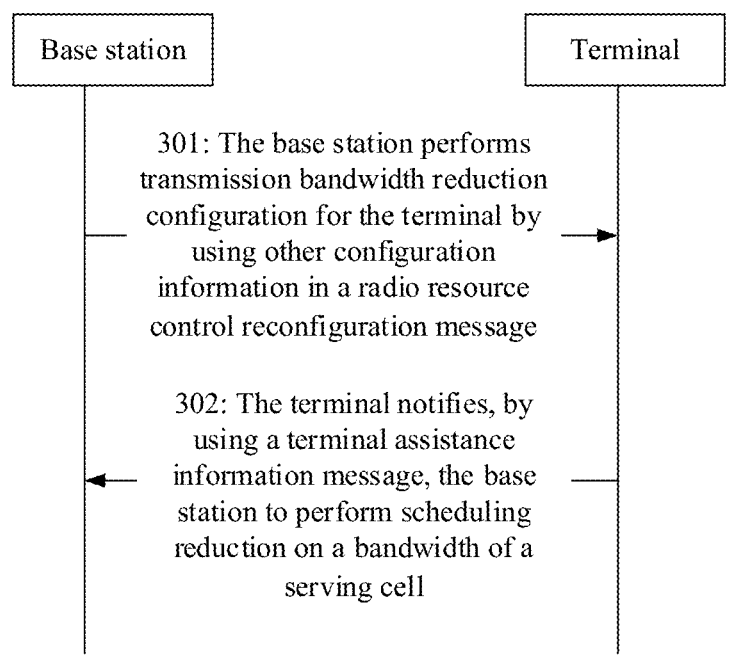
FIG. 3 is a schematic diagram of an embodiment of a network device transmission bandwidth reduction method according to an embodiment of this application.

FIG. 3 is a schematic diagram of an embodiment of a network device transmission bandwidth reduction method according to an embodiment of this application.

301: A base station performs transmission bandwidth reduction configuration for a terminal by using other configuration information in a radio resource control reconfiguration message.

The other configuration (OtherConfig) information in the radio resource control reconfiguration message is extended to indicate that the base station supports network transmission bandwidth reduction, and a minimum time interval between two times of reporting the network transmission bandwidth reduction coefficient is configured.

Specifically, the transmission bandwidth reduction configuration information is newly added to the other configuration (OtherConfig) information in the radio resource control reconfiguration message, to indicate that the base station supports network transmission bandwidth reduction. On one hand, if a network transmission bandwidth reduction coefficient supported by the base station is pre-negotiated by the base station and the terminal, the transmission bandwidth reduction configuration information configured by the base station carries the minimum time interval between two times of reporting the network transmission bandwidth reduction coefficient. For example, the transmission bandwidth reduction configuration information configured by the base station carries a minimum time interval between two times of continuously sending the target transmission bandwidth reduction coefficient by the terminal. On the other hand, if a network transmission bandwidth reduction coefficient supported by the base station is not pre-negotiated by the base station and the terminal, in addition to the minimum time interval between two times of reporting the network transmission bandwidth reduction coefficient, the transmission bandwidth reduction configuration information configured by the base station further carries the network transmission bandwidth reduction coefficient supported by the base station. For example, the transmission bandwidth reduction configuration information configured by the base station carries a minimum time interval between two times of continuously sending the target transmission bandwidth reduction coefficient by the terminal and a parameter set corresponding to the transmission bandwidth reduction coefficient supported by the base station.

302: The terminal notifies, by using a terminal assistance control information message, the base station to perform scheduling reduction on a bandwidth of a serving cell.

The terminal assistance control information message is extended to transmit a bandwidth reduction indication, to indicate the base station to perform transmission bandwidth reduction on the serving cell that provides a service for the terminal.

Specifically, a transmission bandwidth reduction indication manner in which the terminal notifies, in the terminal assistance control information message, the base station to perform transmission bandwidth reduction may be specifically but not limited to the following three transmission bandwidth reduction indication manners. In a first indication manner, corresponding to the foregoing first transmission bandwidth reduction manner, the terminal notifies, in the terminal assistance control information message, the base station to perform scheduling reduction on some or all serving cells in a cell group corresponding to the terminal. In a second indication manner, corresponding to the foregoing second transmission bandwidth reduction manner, the terminal notifies, in the terminal assistance control information message, the base station to perform scheduling reduction on all serving cells that provide services for the terminal, and indicates, in the terminal assistance control information message, that all the serving cells use a same transmission bandwidth reduction coefficient. In a third indication manner, the terminal notifies, in the terminal assistance control information message, the base station to perform scheduling reduction on a bandwidth sum of all serving cells in a cell group, where transmission bandwidth reduction coefficients of different serving cells are allocated by the base station based on actual statuses of the different cells.

Further, the foregoing three transmission bandwidth reduction manners are described by using an example in which cells that provide services for the terminal are a primary cell, a secondary cell 1, and a secondary cell 2 in a master cell group shown in FIG. 1b.

Figure 4:
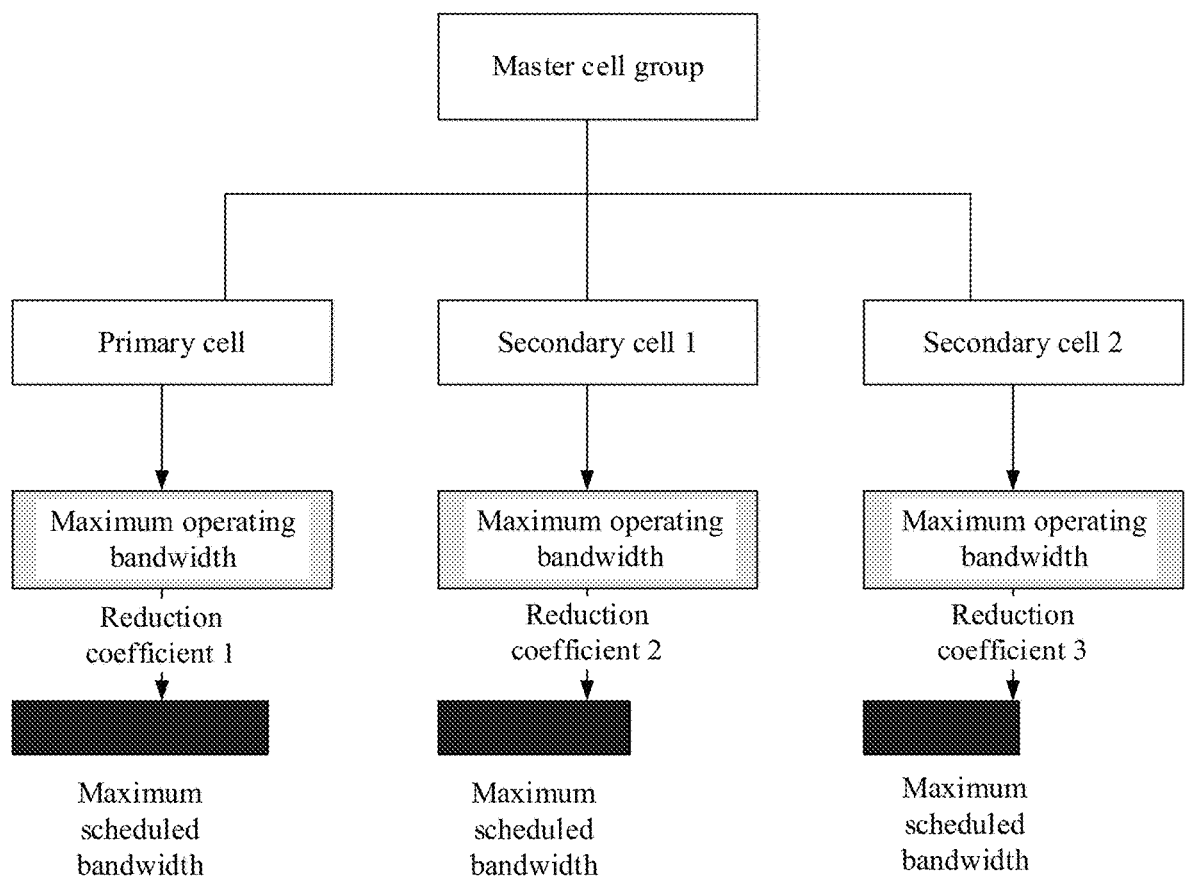
FIG. 4 is a schematic diagram of transmission bandwidth reduction corresponding to a case in which a terminal reports a reduction coefficient of each serving cell according to an embodiment of this application.

First, the foregoing first transmission bandwidth reduction manner is described. FIG. 4 is a schematic diagram of transmission bandwidth reduction corresponding to a case in which a terminal reports a reduction coefficient of each serving cell according to an embodiment of this application. As shown in FIG. 4, for each time of transmission bandwidth reduction, the terminal reports three transmission bandwidth reduction coefficients by using the terminal assistance control information message: a reduction coefficient 1 of the primary cell, a reduction coefficient 2 of the secondary cell 1, and a reduction coefficient 3 of the secondary cell 2. Finally, the base station performs scheduling reduction on a maximum scheduled bandwidth of each serving cell for the terminal based on a transmission bandwidth reduction coefficient that is of each cell and that is reported by the terminal, to reduce a scheduled bandwidth of the serving cell for the terminal. The base station respectively performs scheduling reduction on maximum operating bandwidths (shown by gray parts in FIG. 4) of the primary cell, the secondary cell 1, and the secondary cell 2 based on the reduction coefficient 1 of the primary cell, the reduction coefficient 2 of the secondary cell 1, and the reduction coefficient 3 of the secondary cell 2, to reduce respective actual scheduled bandwidths (shown by black parts in FIG. 4) of the primary cell, the secondary cell 1, and the secondary cell 2 for the terminal.

Figure 5:
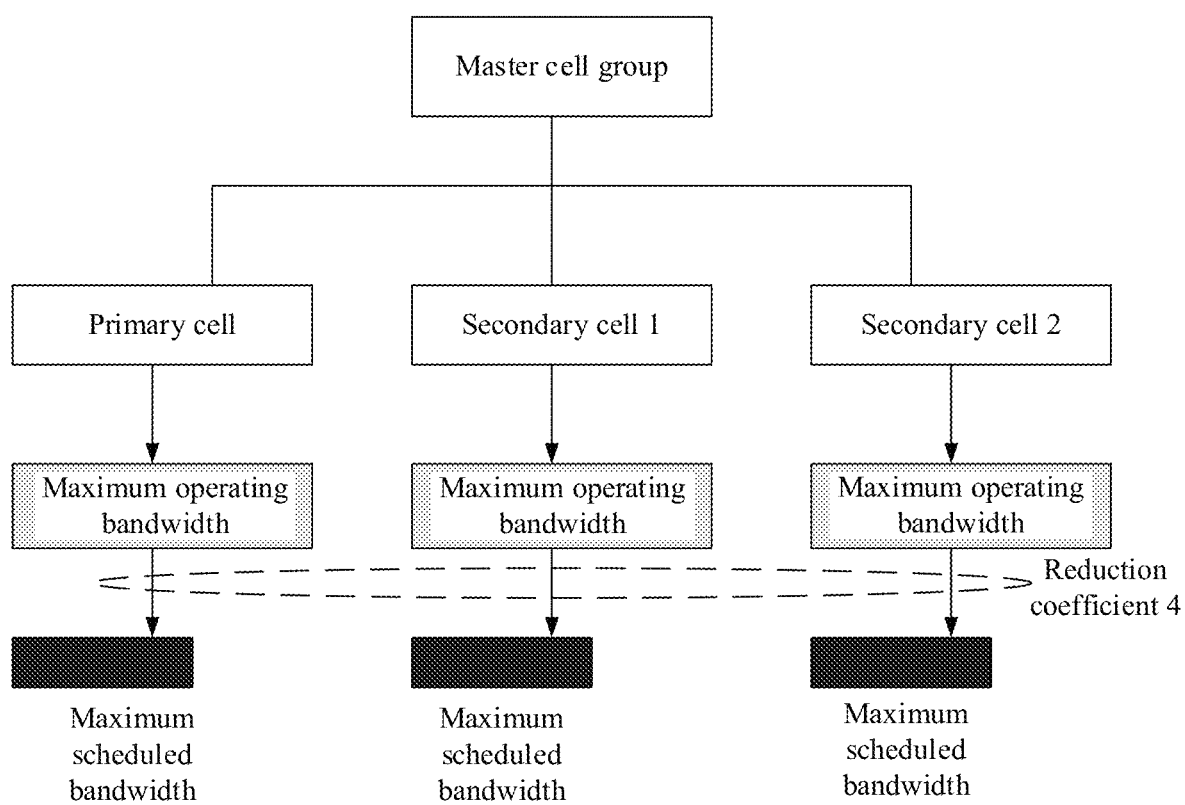
FIG. 5 is a schematic diagram of transmission bandwidth reduction corresponding to a case in which a terminal reports a reduction coefficient common to all serving cells according to an embodiment of this application.

Next, the foregoing second transmission bandwidth reduction manner is described. FIG. 5 is a schematic diagram of transmission bandwidth reduction corresponding to a case in which a terminal reports a reduction coefficient common to all serving cells according to an embodiment of this application. As shown in FIG. 5, for each time of transmission bandwidth reduction, the terminal reports only one reduction coefficient 4 by using the terminal assistance control information message. The reduction coefficient 4 is a transmission bandwidth reduction coefficient jointly corresponding to the primary cell, the secondary cell 1, and the secondary cell 2. Finally, the base station separately performs scheduling reduction on maximum operating bandwidths (shown by gray parts in FIG. 5) of the primary cell, the secondary cell 1, and the secondary cell 2 based on the bandwidth reduction coefficient 4 that is reported by the terminal and that jointly corresponds to all the serving cells in the cell group corresponding to the terminal, to reduce respective actual scheduled bandwidths (as shown by black parts in FIG. 5) of the primary cell, the secondary cell 1, and the secondary cell 2 for the terminal.

Figure 6:
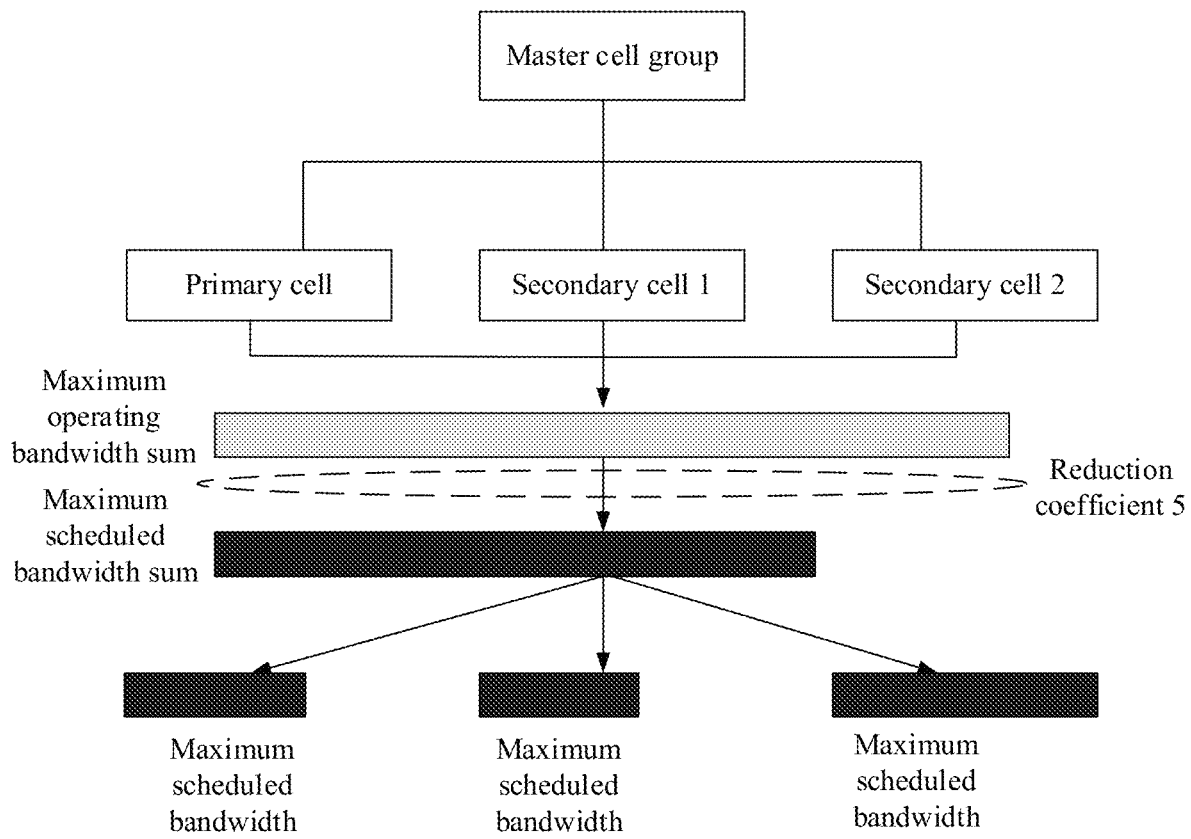
FIG. 6 is a schematic diagram of transmission bandwidth reduction corresponding to a case in which a terminal reports a reduction coefficient of a total transmission bandwidth of all serving cells according to an embodiment of this application.

Finally, the foregoing third transmission bandwidth reduction manner is described. FIG. 6 is a schematic diagram of transmission bandwidth reduction corresponding to a case in which a terminal reports a reduction coefficient of a total transmission bandwidth of all serving cells according to an embodiment of this application. Similar to the foregoing second transmission bandwidth reduction manner, the terminal reports one transmission bandwidth reduction coefficient. As shown in FIG. 6, the terminal reports only one reduction coefficient 5 by using the terminal assistance control information message. Different from the foregoing second transmission bandwidth reduction manner, the reduction coefficient 5 corresponds to a bandwidth sum of all the serving cells in the cell group, instead of being a transmission bandwidth reduction coefficient jointly corresponding to all the serving cells in the cell group. Further, the base station determines, based on the reduction coefficient 5 and the bandwidth sum of all the serving cells in the cell group, a total bandwidth that can be reduced for the terminal; and further, allocates, based on a network scheduling status of each serving cell in the cell group, the determined total bandwidth that can be reduced for the terminal to cells, for example, the primary cell, the secondary cell 1, and the secondary cell 2, to perform scheduling reduction on maximum operating bandwidths (shown by a gray part in FIG. 6) of the primary cell, the secondary cell 1, and the secondary cell 2, to reduce respective actual scheduled bandwidths (as shown by black parts in FIG. 6) of the primary cell, the secondary cell 1, and the secondary cell 2 for the terminal.

It should be noted that, in an embodiment of this application, a range of each transmission bandwidth reduction coefficient is from 0 to 1, including 0 and 1.

In an embodiment of this application, the other configuration (OtherConfig) information in the radio resource control reconfiguration message is extended, and the terminal assistance control information message is extended to indicate the base station to perform transmission bandwidth reduction on the serving cell that provides the service for the terminal, to reduce a maximum scheduled bandwidth of the base station for the terminal, to reduce a scheduled bandwidth of the base station for the terminal, thereby reducing a power loss of the terminal and improving a battery life of the terminal.

In the second information carrying manner, the transmission bandwidth reduction configuration information is carried in the primary cell configuration (SpCellConfig) information in the radio resource control reconfiguration message, and the target transmission bandwidth reduction coefficient is carried in the MAC CE.

Figure 7:
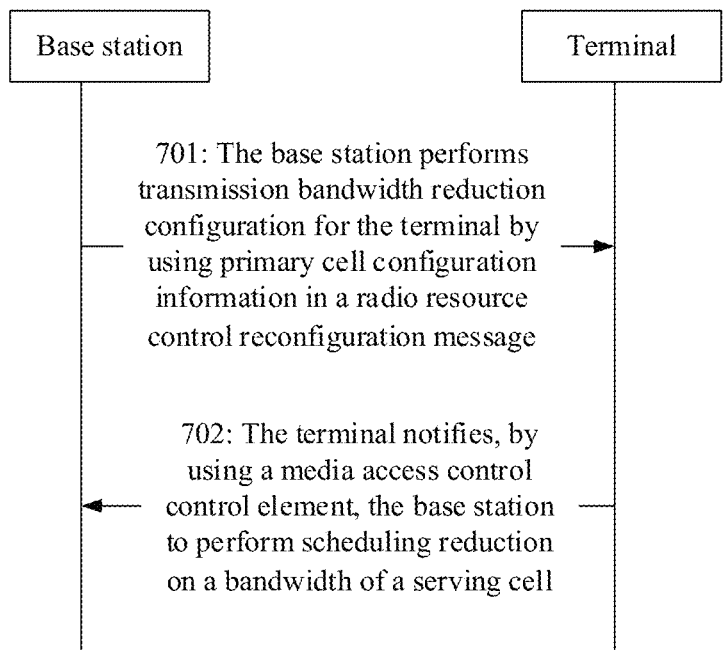
FIG. 7 is a schematic diagram of an embodiment of a network device transmission bandwidth reduction method according to an embodiment of this application.

FIG. 7 is a schematic diagram of another embodiment of a network device transmission bandwidth reduction method according to an embodiment of this application.

701: A base station performs transmission bandwidth reduction configuration for a terminal by using primary cell configuration information in a radio resource control reconfiguration message.

The base station extends the primary cell configuration (SpCellConfig) information in the radio resource control configuration message, to indicate that the base station supports network transmission bandwidth reduction. It may also be understood as indicating that a corresponding cell group (CellGroup) supports network transmission bandwidth reduction.

Specifically, the transmission bandwidth reduction configuration information is newly added to the primary cell configuration (SpCellConfig) information in the radio resource control reconfiguration message, to indicate that the base station supports network transmission bandwidth reduction. It should be noted that other descriptions in step 701 are similar to those in step 301. For the other descriptions in step 701, refer to the related descriptions in step 301. Details are not described herein again.

702: The terminal notifies, by using an MAC control element, the base station to perform scheduling reduction a bandwidth of a serving cell.

The MAC CE is newly added, to indicate a reduction coefficient that corresponds to each carrier and that is expected by the terminal in a primary cell (SpCell), that is, a target bandwidth reduction coefficient. It should be noted that the primary cell (SpCell) may be a primary cell in any cell group, for example, the foregoing primary cell group or secondary cell group shown in FIG. 1*b*. This is not specifically limited in this application.

Specifically, when power consumption of the terminal needs to be reduced, the terminal sends, to the base station, the MAC CE used to indicate the reduction coefficient that corresponds to each carrier and that is expected by the terminal in the primary cell (SpCell), and reports, in the corresponding MAC CE, a transmission bandwidth reduction coefficient of the serving cell corresponding to the terminal.

Specifically, a MAC CE 50 and a MAC CE 51 may be newly added for the terminal to report the transmission bandwidth reduction coefficient to the base station.

Figure 8:
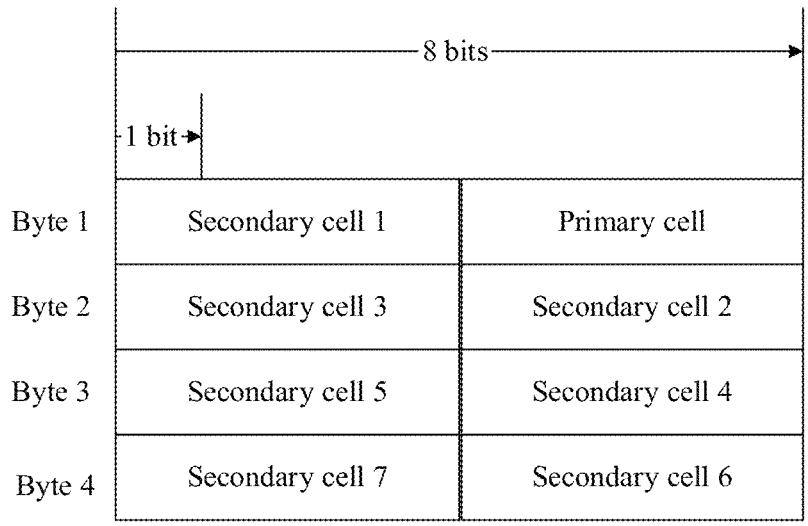
FIG. 8 is a schematic structural diagram of a MAC CE 50 according to an embodiment of this application.

On one hand, a structure definition of the MAC CE 50 is shown in FIG. 8. The MAC CE 50 includes 4 bytes: a byte 1, a byte 2, a byte 3, and a byte 4. Each byte stores two transmission bandwidth reduction coefficients, and a length of each transmission bandwidth reduction coefficient is 4 bits and represents a proportion that is expected by the terminal and that is of a bandwidth scheduled by the base station on a corresponding carrier in a maximum scheduled bandwidth. As shown in FIG. 8, the byte 1 stores transmission bandwidth reduction coefficients corresponding to a primary cell and a secondary cell 1, the byte 2 stores transmission bandwidth reduction coefficients of secondary cells 2 and 3, the byte 3 stores transmission bandwidth reduction coefficients of secondary cells 4 and 5, and the byte 4 stores transmission bandwidth reduction coefficients of secondary cells 6 and 7.

Figure 9:
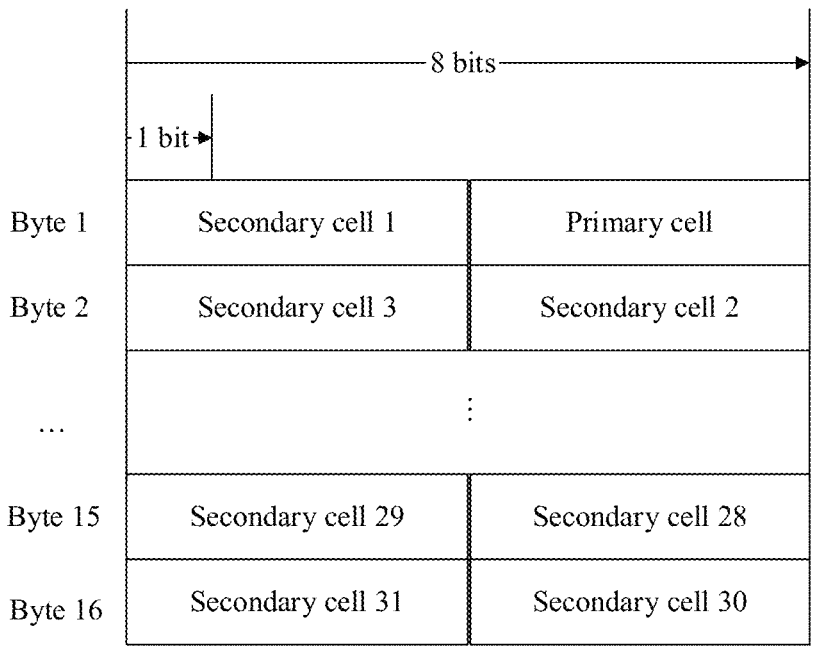
FIG. 9 is a schematic structural diagram of a MAC CE 51 according to an embodiment of this application.

On the other hand, a structure definition of the MAC CE 51 is shown in FIG. 9. A structure of the MAC CE 51 is similar to a structure of the MAC CE 50 shown in FIG. 8. A difference lies in that the structure of the MAC CE 51 includes 16 bytes that can store transmission bandwidth reduction coefficients corresponding to 32 cells. Details are shown in FIG. 9, and the details are not described herein.

Further, a correspondence between a transmission bandwidth reduction coefficient and a value of 4 bits in the MAC CE 50 shown in FIG. 8 and the MAC CE 51 shown in FIG. 9 includes but is not limited to a correspondence shown in the following Table 1.

TABLE 1

| Value of 4 bits | Transmission bandwidth reduction coefficient |
|---|---|
| 0000 | 1.0 |
| 0001 | 0.9 |
| 0010 | 0.8 |
| 0011 | 0.7 |
| 0100 | 0.6 |
| 0101 | 0.5 |
| 0110 | 0.4 |
| 0111 | 0.3 |
| 1000 | 0.2 |
| 1001 | 0.1 |
| Another value | Reserved |

It should be noted that a specific transmission bandwidth reduction indication manner in which the terminal notifies, in the MAC CE, the base station to perform transmission bandwidth reduction is similar to the specific transmission bandwidth reduction indication manner in which the terminal notifies, in the terminal assistance control information message, the base station to perform transmission bandwidth reduction in step 302. For the specific transmission bandwidth reduction indication manner, refer to the related descriptions in step 302 and FIG. 4 to FIG. 7. Details are not described herein again.

A logical channel identifier (LCID) is defined in an existing MAC protocol. LCID values (0 to 63) are uplink MAC CEs, where LCID values 31 to 51 are not assigned related definitions and therefore are used as reserved bits, and the other LCIDs are all assigned related definitions. In an embodiment of this application, reserved bits LCID values 50 and 51 in the existing MAC protocol are respectively referred to as an uplink MAC CE 50 and an uplink MAC CE 51 after being assigned new definitions, so that the uplink MAC CE 50 and the uplink MAC CE 51 are used to indicate the reduction coefficient that corresponds to each carrier and that is expected by the terminal. It should be further noted that any MAC CE 50 described in an embodiment of this application is an uplink MAC CE with an LCID value 50. Likewise, any MAC CE 51 described in an embodiment of this application is an uplink MAC CE with an LCID value 51.

In an embodiment of this application, definitions of uplink MAC CEs to which the uplink MAC CE 50 and the uplink MAC CE 51 are newly added include but are not limited to definitions shown in the following Table 2 and Table 3.

TABLE 2

| LCID of an uplink MAC CE | Definition |
|---|---|
| 0 | 64-bit CCCH |
| 1 to 32 | Logical channel identifier |
| 33 to 49 | Reserved bits |
| 50 | 4-byte transmission bandwidth reduction parameter |
| 51 | 16-byte transmission bandwidth reduction parameter |
| 52 | 48-bit CCCH |
| 53 | Recommended bit rate query |
| 54 | Multi-input PHR (4-byte Ci) |
| 55 | Configuration authorization confirmation |
| 56 | Multi-input PHR (1-byte Ci) |
| 57 | Single-input PHR |
| 58 | C-RNTI |
| 59 | Short truncated BSR |
| 60 | Long truncated BSR |
| 61 | Short BSR |
| 62 | Long BSR |
| 63 | Stuffed |

TABLE 3

| LCID of an uplink MAC CE | Definition |
|---|---|
| 0 | 64-bit CCCH |
| 1 to 32 | Logical channel identifier |
| 33 to 50 | Reserved bits |
| 51 | 16-byte transmission bandwidth reduction parameter |
| 52 | 48-bit CCCH |
| 53 | Recommended bit rate query |
| 54 | Multi-input PHR (4-byte Ci) |
| 55 | Configuration authorization confirmation |
| 56 | Multi-input PHR (1-byte Ci) |
| 57 | Single-input PHR |
| 58 | C-RNTI |
| 59 | Short truncated BSR |
| 60 | Long truncated BSR |
| 61 | Short BSR |
| 62 | Long BSR |
| 63 | Stuffed |

In the foregoing Table 2 and Table 3, the CCCH is an abbreviation of a common control channel, the PHR is an abbreviation of a power headroom report, the C-RNTI is an abbreviation of a cell radio network temporary identifier, and the BSR is an abbreviation of a buffer status report. It should be noted that for details of the related definitions of the uplink MAC CEs in Table 2 and Table 3, refer to related definitions of uplink MAC CEs in the existing MAC protocol. The details are not described herein.

In an embodiment of this application, the primary cell configuration (SpCellConfig) information in the radio resource control configuration message is extended to indicate that the corresponding cell group supports network transmission bandwidth reduction. In addition, an uplink MAC control element (for example, the MAC CE 50 or the MAC CE 51) that is used to indicate a transmission bandwidth reduction coefficient that is of a serving cell and that is expected by the terminal in the cell group is newly added for the terminal to report the target transmission bandwidth reduction coefficient, to reduce a scheduled bandwidth of the base station for the terminal, thereby reducing a power loss of the terminal and improving a battery life of the terminal.

The foregoing mainly describes, from a perspective of interaction between the base station and the terminal, the solutions provided in the embodiments of this application. It may be understood that, to implement the foregoing functions, the terminal and the base station include corresponding hardware structures and/or software modules for executing the functions. A person skilled in the art should easily be aware that, in combination with the examples described in the embodiments disclosed in this specification, modules and algorithm steps can be implemented in this application in a form of hardware or a combination of hardware and computer software. Whether a function is executed by using hardware or hardware driven by computer software depends on particular applications and design constraints of the technical solutions. A person skilled in the art may use different methods to implement the described functions for each particular application, but it should not be considered that the implementation goes beyond the scope of this application.

In terms of a hardware structure, the terminal 201 or the network device 202 in FIG. 2 may be implemented by using one entity device, or may be jointly implemented by using a plurality of entity devices, or may be a logical function module in one entity device. This is not specifically limited in the embodiments of this application.

Figure 10:
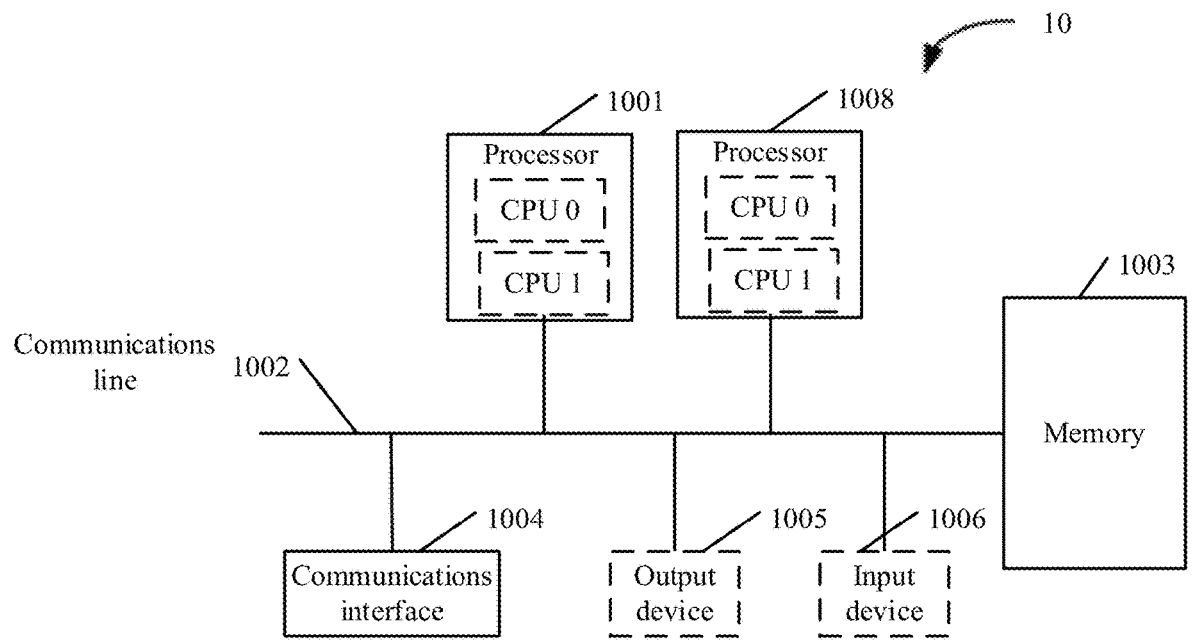
FIG. 10 is a schematic diagram of a hardware structure of a communications device according to an embodiment of this application.

For example, the terminal 201 or the network device 202 in FIG. 2 may be implemented by using a communications device in FIG. 10. FIG. 10 is a schematic diagram of a hardware structure of the communications device according to an embodiment of this application.

The communications device 10 includes at least one processor 1001, a communications line 1002, a memory 1003, and at least one communications interface 1004.

The processor 1001 may be a general-purpose central processing unit (CPU), a microprocessor, an application-specific integrated circuit (server IC), or one or more integrated circuits configured to control program execution of the solutions in this application.

The communications line 1002 may include a path for transmitting information between the foregoing components.

The communications interface 1004 is any apparatus such as a transceiver, and configured to communicate with another device or a communications network such as the Ethernet, a radio access network (RAN), or a wireless local area network (WLAN).

The memory 1003 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another optical disk storage or optical disc storage (including a compact disc, a laser disc, an optical disc, a digital versatile disc, a Blu-ray disc, and the like), a magnetic disk storage medium or another magnetic storage device, or any other media that can be configured to carry or store desired program code in a form of an instruction or a data structure and that is accessible to a computer; but is not limited thereto. The memory may exist independently and is connected to the processor by using the communications line 1002. Alternatively, the memory may be integrated into the processor.

The memory 1003 is configured to store computer executable instructions for executing the solutions of this application, and the processor 1001 controls the execution. The processor 1001 is configured to execute the computer executable instructions stored in the memory 1003, to implement the network device transmission bandwidth reduction method provided in the following embodiments of this application.

Optionally, the computer executable instructions in an embodiment of this application may also be referred to as application program code. This is not specifically limited in an embodiment of this application.

During specific implementation, in an embodiment, the processor 1001 may include one or more CPUs, for example, a CPU 0 and a CPU 1 in FIG. 10.

During specific implementation, in an embodiment, the communications device 10 may include a plurality of processors such as the processor 1001 and a processor 1008 in FIG. 10. Each of these processors may be a single-core (single-CPU) processor, or may be a multi-core (multi-CPU) processor. The processor herein may be one or more devices, circuits, and/or processing cores for processing data (such as a computer program instruction).

During specific implementation, in an embodiment, the communications device 10 may further include an output device 1005 and an input device 1006. The output device 1005 communicates with the processor 1001, and may display information in a plurality of manners. For example, the output device 1005 may be a liquid crystal display (LCD), a light emitting diode (LED) display device, a cathode-ray tube (CRT) display device, or a projector (projector). The input device 1006 communicates with the processor 1001, and may receive user input in a plurality of manners. For example, the input device 1006 may be a mouse, a keyboard, a touchscreen device, or a sensing device.

The communications device 10 may be a general-purpose device or a dedicated device. During specific implementation, the communications device 10 may be a desktop computer, a portable computer, a network server, a palmtop compute (PDA), a mobile phone, a tablet computer, a wireless terminal device, an embedded device, or a device with a structure similar to that in FIG. 10. A type of the communications device 10 is not limited in an embodiment of this application.

In the embodiments of this application, the terminal and the base station each may be divided into function modules based on the foregoing method examples. For example, each function module may be obtained through division based on each function, or two or more functions may be integrated into one processing module. The integrated module may be implemented in a form of hardware, or may be implemented in a form of a software function module. It should be noted that, in the embodiments of this application, the module division is an example and is merely logical function division. During actual implementation, another division manner may be used.

Figure 11:
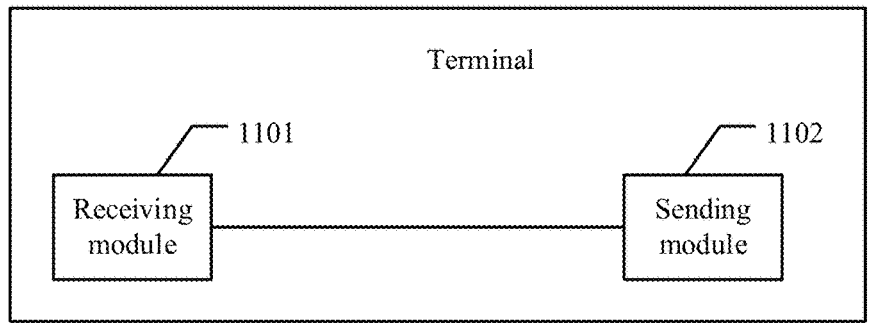
FIG. 11 is a schematic structural diagram of a terminal according to an embodiment of this application.

For example, when function modules are obtained through division in an integrated manner, FIG. 11 is a schematic structural diagram of a terminal.

As shown in FIG. 11, the terminal in an embodiment of this application includes a receiving module 1101 and a sending module 1102. The receiving module 1101 may receive the transmission bandwidth reduction configuration information added by the base station by using the other configuration information in the radio resource control reconfiguration message in step 301, and the sending module 1102 may perform step 302. Details are not described herein again.

Alternatively, the receiving module 1101 may receive the transmission bandwidth reduction configuration information added by the base station by using the primary cell configuration information in the radio resource control reconfiguration message in step 701, and the sending module 1102 may perform step 702. Details are not described herein again.

In addition, the receiving module 1101 and the sending module 1102 may be a transceiver integrated into the terminal, such as a baseband chip.

It should be noted that, all the related content of the steps related to the terminal in the foregoing method embodiments can be cited in function descriptions of corresponding function modules. Details are not described herein again.

In some embodiments, the terminal is presented in a form of function modules obtained through division in an integrated manner. The "module" herein may be an application-specific integrated circuit (ASIC), a circuit, a processor that executes one or more software programs or firmware programs and a memory, an integrated logic circuit, and/or another component that can provide the foregoing function. In a simple embodiment, a person skilled in the art may figure out that the terminal may be in the form shown in FIG. 10.

For example, in FIG. 10, the processor 1001 may invoke the computer executable instructions stored in the memory 1003, to enable the terminal to perform the network device transmission bandwidth reduction method in the foregoing method embodiments.

Specifically, functions/implementation processes of the receiving module 1101 and the sending module 1102 in FIG. 11 may be implemented by invoking, by the processor 1001, the computer executable instructions stored in the memory 1003 in FIG. 10. Alternatively, functions/implementation processes of the receiving module 1101 and the sending module 1102 in FIG. 11 may be implemented by using the communications interface 1004 in FIG. 10.

The terminal provided in an embodiment of this application may be configured to perform the foregoing network device transmission bandwidth reduction method. Therefore, for a technical effect that can be obtained by the terminal, refer to the foregoing method embodiments. Details are not described herein again.

Figure 12:
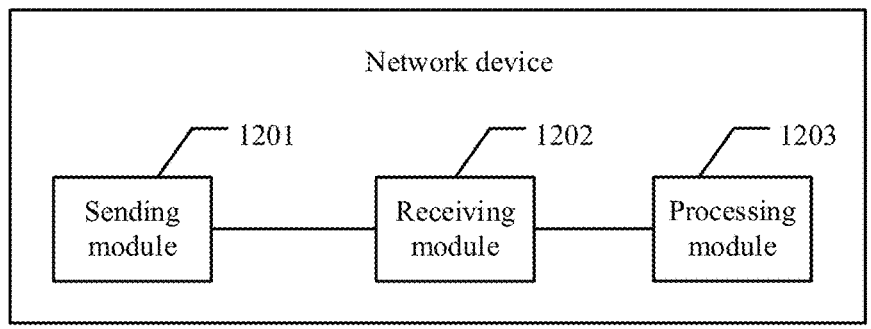
FIG. 12 is a schematic structural diagram of a network device according to an embodiment of this application.

FIG. 12 is a schematic structural diagram of a network device.

As shown in FIG. 12, the network device in an embodiment of this application includes a sending module 1201, a receiving module 1202, and a processing module 1203. The sending module 1201 may perform step 301, the receiving module 1202 may receive the terminal assistance control information that is sent by the terminal and that is used to indicate the base station to perform transmission bandwidth reduction on the serving cell that provides the service for the terminal in step 302, and the processing module 1203 is configured to reduce the transmission bandwidth of the serving cell based on the target transmission bandwidth reduction coefficient reported by the terminal. Details are not described herein again.

Alternatively, the sending module 1201 may perform step 701, the receiving module 1202 may receive the MAC control element (for example, the MAC CE 50 and the MAC CE 51) that is sent by the terminal and that is used to indicate the base station to perform transmission bandwidth reduction on the serving cell that provides the service for the terminal in step 702, and the processing module 1203 is configured to reduce the transmission bandwidth of the serving cell based on the target transmission bandwidth reduction coefficient reported by the terminal. Details are not described herein again.

Likewise, the sending module 1201 and the receiving module 1202 may be a transceiver integrated into the terminal, such as a baseband chip. The processing module 1203 may also be a processor integrated into the network device.

It should be noted that, all the related content of the steps related to the network device in the foregoing method embodiments can be cited in function descriptions of corresponding function modules. Details are not described herein again.

In some embodiments, the network device is presented in a form of function modules obtained through division in an integrated manner. The "module" herein may be an application-specific integrated circuit (ASIC), a circuit, a processor that executes one or more software programs or firmware programs and a memory, an integrated logic circuit, and/or another component that can provide the foregoing function. In a simple embodiment, a person skilled in the art may figure out that the network device may be in the form shown in FIG. 10.

For example, in FIG. 10, the processor 1001 may invoke the computer executable instructions stored in the memory 1003, to enable the network device to perform the network device transmission bandwidth reduction method in the foregoing method embodiments.

Specifically, functions/implementation processes of the sending module 1201, the receiving module 1202, and the processing module 1203 in FIG. 12 may be implemented by invoking, by the processor 1001, the computer executable instructions stored in the memory 1003 in FIG. 10. Alternatively, a function/an implementation process of the processing module 1203 in FIG. 12 may be implemented by invoking, by the processor 1001, the computer executable instructions stored in the memory 1003 in FIG. 10, and functions/implementation processes of the sending module 1201 and the receiving module 1202 in FIG. 12 may be implemented by using the communications interface 1004 in FIG. 10.

The network device provided in an embodiment of this application may be configured to perform the foregoing network device transmission bandwidth reduction method. Therefore, for a technical effect that can be obtained by the network device, refer to the foregoing method embodiments. Details are not described herein again.

In the foregoing embodiments, the terminal and the network device each are presented in a form of function modules obtained through division in an integrated manner. Certainly, in the embodiments of this application, each function module of the terminal and the network device may be obtained through division based on each corresponding function. This is not specifically limited in the embodiments of this application.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk Solid State Disk (SSD)), or the like.

The term "and/or" in this application may indicate an association relationship for describing associated objects and represents that three relationships may exist. For example, A and/or B may represent the following three cases: Only A exists, both A and B exist, and only B exists. In addition, the character "/" in this application generally indicates an "or" relationship between the associated objects.

In the specification, claims, and accompanying drawings of this application, the terms such as "first" and "second" are intended to distinguish between similar objects but do not necessarily describe a specific order or sequence. It should be understood that the data termed in such a way is interchangeable in a proper circumstance so that the embodiments described herein can be implemented in an order other than the order of the content illustrated or described herein. Moreover, the terms "include", "contain", and any other variants thereof are intended to cover non-exclusive inclusion. For example, a process, method, system, product, or device that includes a list of steps or modules is not necessarily limited to those steps or modules expressly listed, but may include other steps or modules not expressly listed or inherent to such a process, method, system, product, or device. The names or numbers of the steps in this application do not mean that the steps in the method procedure need to be performed according to the time/logical order indicated by the names or numbers, and the execution order of the procedure steps that have been named or numbered may be changed based on the to-be-achieved technical objective, provided that the same or similar technical effects can be achieved. The module division in this application is logical division. During implementation in actual application, another division manner may be used. For example, a plurality of modules may be combined or integrated into another system, or some features may be ignored or not performed. In addition, the displayed or discussed mutual couplings or direct couplings or communication connections may be implemented by using some interfaces. The indirect couplings or communication connections between the modules may be implemented in an electronic form or another form. This is not limited in this application. In addition, modules or sub-modules described as separate components may be or may not be physically separated, or may be or may not be physical modules, or may be distributed in a plurality of circuit modules. The objective of the solutions of this application may be achieved by selecting some or all of the modules according to actual requirements.

A person of ordinary skill in the art may understand that all or some of the steps of the methods in the embodiments may be implemented by using a program to instruct related hardware. The program may be stored in a computer-readable storage medium. The storage medium may include a ROM, a RAM, a magnetic disk, an optical disc, or the like.

The foregoing describes in detail the network device transmission bandwidth reduction method, device, and system that are provided in the embodiments of this application. The principle and implementations of this application are described herein by applying specific examples. The foregoing descriptions of the embodiments are merely provided to help understand the method and core ideas of this application. In addition, a person of ordinary skill in the art can make variations to this application in terms of the specific implementations and application scope according to the ideas of this application. In conclusion, the content of this specification shall not be construed as a limitation to this application.

What is claimed is:

1. A network device transmission bandwidth reduction method, comprising:
   receiving, by a terminal, transmission bandwidth reduction configuration information sent by a network device, wherein the transmission bandwidth reduction configuration information comprises a set of transmission bandwidth reduction parameters supported by the network device; and
   sending a target transmission bandwidth reduction coefficient to the network device, wherein the target transmission bandwidth reduction coefficient is a transmission bandwidth reduction coefficient that is of a serving cell and is expected by the terminal, and the serving cell comprises one or more cells that currently provide services for the terminal;
   wherein the target transmission bandwidth reduction coefficient comprises at least one of the following:
   transmission bandwidth reduction coefficients respectively corresponding to the serving cell, wherein the serving cell comprises cells that provide services for the terminal; or
   a transmission bandwidth reduction coefficient jointly corresponding to the serving cell, wherein the serving cell comprises cells that provide services for the terminal; or
   a transmission bandwidth reduction coefficient corresponding to a total bandwidth of the serving cell, wherein the serving cell comprises cells that provide services for the terminal.

2. The method according to claim 1, wherein the receiving, by a terminal, transmission bandwidth reduction configuration information sent by a network device comprises:
   receiving, by the terminal, the transmission bandwidth reduction configuration information sent by the network device by using a radio resource control reconfiguration message; and
   the sending a target transmission bandwidth reduction coefficient to the network device comprises:
   sending the target transmission bandwidth reduction coefficient to the network device by using a terminal assistance information message; or
   sending the target transmission bandwidth reduction coefficient to the network device by using a media access control (MAC) control element.

3. The method according to claim 1, wherein the transmission bandwidth reduction configuration information comprises a minimum time interval for continuously sending the target transmission bandwidth reduction coefficient.

4. The method according to claim 3, wherein the transmission bandwidth reduction configuration information further comprises a set of transmission bandwidth reduction coefficients supported by the network device.

5. A network device transmission bandwidth reduction method, comprising:
- sending, by a network device, transmission bandwidth reduction configuration information to a terminal, wherein the transmission bandwidth reduction configuration information comprises a set of transmission bandwidth reduction parameters supported by the network device;
- receiving a target transmission bandwidth reduction coefficient sent by the terminal, wherein the target transmission bandwidth reduction coefficient is a transmission bandwidth reduction coefficient that is of a serving cell and is expected by the terminal, and the serving cell comprises cells that currently provide services for the terminal; and
- reducing, by the network device, a transmission bandwidth of the serving cell based on the target transmission bandwidth reduction coefficient;
- wherein the target transmission bandwidth reduction coefficient comprises at least one of the following:
- transmission bandwidth reduction coefficients respectively corresponding to the serving cell that provide the services for the terminal; or
- a transmission bandwidth reduction coefficient jointly corresponding to the serving cells that provide the services for the terminal; or
- a transmission bandwidth reduction coefficient corresponding to a total bandwidth of the serving cells that provide the services for the terminal.

6. The method according to claim 5, wherein the sending, by a network device, transmission bandwidth reduction configuration information to a terminal comprises:
- sending, by the network device, the transmission bandwidth reduction configuration information to the terminal by using a radio resource control reconfiguration message; and
- the receiving a target transmission bandwidth reduction coefficient sent by the terminal comprises:
- receiving, by the network device, the target transmission bandwidth reduction coefficient sent by the terminal by using a terminal assistance information message; or
- receiving, by the network device, the target transmission bandwidth reduction coefficient sent by the terminal by using a media access control (MAC) control element.

7. The method according to claim 5, wherein the transmission bandwidth reduction configuration information comprises a minimum time interval for continuously sending the target transmission bandwidth reduction coefficient.

8. The method according to claim 7, wherein the transmission bandwidth reduction configuration information further comprises a set of transmission bandwidth reduction coefficients supported by the network device.

9. A terminal, comprising a processor and a memory, wherein;
- the memory is configured to store a program instruction; and
- the processor is configured to invoke the program instruction in the memory to perform:
- receiving transmission bandwidth reduction configuration information sent by a network device, wherein the transmission bandwidth reduction configuration information comprises a set of transmission bandwidth reduction parameters supported by the network device; and
- sending a target transmission bandwidth reduction coefficient to the network device, wherein the target transmission bandwidth reduction coefficient is a transmission bandwidth reduction coefficient that is of a serving cell and that is expected by the terminal, and the serving cell comprises one or more cells that currently provide services for the terminal;
- wherein the target transmission bandwidth reduction coefficient comprises at least one of the following:
- transmission bandwidth reduction coefficients respectively corresponding to the serving cell, wherein the serving cell comprises one or more cells that provide services for the terminal; or
- a transmission bandwidth reduction coefficient jointly corresponding to the serving cell, wherein the serving cell comprises one or more cells that provide services for the terminal; or
- a transmission bandwidth reduction coefficient corresponding to a total bandwidth of the serving cell, wherein the serving cell comprises one or more cells that provide services for the terminal.

10. The terminal according to claim 9, wherein the receiving transmission bandwidth reduction configuration information sent by a network device comprises:
- receiving the transmission bandwidth reduction configuration information sent by the network device by using a radio resource control reconfiguration message; and
- the sending a target transmission bandwidth reduction coefficient to the network device comprises:
- sending the target transmission bandwidth reduction coefficient to the network device by using a terminal assistance information message; or
- sending, by the terminal, the target transmission bandwidth reduction coefficient to the network device by using a media access control (MAC) control element.

11. The terminal according to claim 9, wherein the transmission bandwidth reduction configuration information comprises a minimum time interval for continuously sending the target transmission bandwidth reduction coefficient.

12. The terminal according to claim 9, wherein the transmission bandwidth reduction configuration information further comprises a set of transmission bandwidth reduction coefficients supported by the network device.

* * * * *